April 3, 1928.  E. RODOLAUSSE  1,665,112

SPEED CONTROLLING DEVICE FOR RAILWAY AND TRAMWAY TRAINS

Filed Dec. 16, 1924

OPERATED BY CENTRIFUGAL GOVERNOR

CONTROLLED FROM THE TRACK

Inventor
Eloi Rodolausse
by
Attorneys.

Patented Apr. 3, 1928.

1,665,112

UNITED STATES PATENT OFFICE.

ELOI RODOLAUSSE, OF ST.-ANTONIN, FRANCE.

SPEED-CONTROLLING DEVICE FOR RAILWAY AND TRAMWAY TRAINS.

Application filed December 16, 1924, Serial No. 756,265, and in France December 21, 1923.

In the United States Patents #1,527,081; #1,544,483; and #1,549,563 has been described an apparatus for the supervision and control of the diminutions of speed and stoppages prescribed to railway trains, automatically producing braking in case of excess of speed or of nonobservation of the stoppages or diminutions of speed indicated to the engineer by an index called "supervision" index rocking opposite a second index called "speed" index the oscillations of which are functions of the speed of the train.

The limitations of speed indicated by the supervision index are obtained by the automatic return of this latter towards the zero of a dial, return being caused by the tripping, by an abutment on the track, of a cam having a special profile and so determined that the supervision index it controls is brought, at the end of a revolution of the said cam, in the position indicating absolute stoppage; the two indices being so arranged that, if the engineer does not regulate the speed according to the indications of the supervision index, the latter is met by the speed index and that the contact of the two indices causes the automatic application of the brakes.

Now, it is known that with continuous brakes, a normal and constant pressure is necessary for obtaining a stoppage in the same conditions of distance and profile of the track, so that when this pressure is inferior to the normal pressure, the stoppage can be obtained on one and the same profile only on a longer distance.

It results therefrom that the cam controlling the supervision index having a profile determined for commanding the stoppage on a normal distance, risks of exerting only an insufficient control of the action of the mechanism and of making up but insufficiently for the negligence of the engineer in case the pressure of the compressed air of the brakes is inferior to the normal.

The present patent application is adapted to remedy this inconvenience and has for its object a device so constructed as to automatically modify the braking action when the pressure of the compressed air of the brakes is inferior to the normal pressure with the view of making it possible in case of release of the cam, to obtain the stoppage within the distance according to the regulations, notwithstanding the partial vacuum which arises and to obtain, through the automatic locking of the rod controlling the valve of the servo-motor the prolongation of the braking action until the speed is reduced to about zero.

In order that the invention may be clearly understood, it will be described hereafter with reference to the accompanying drawing in which.

Figure 1:
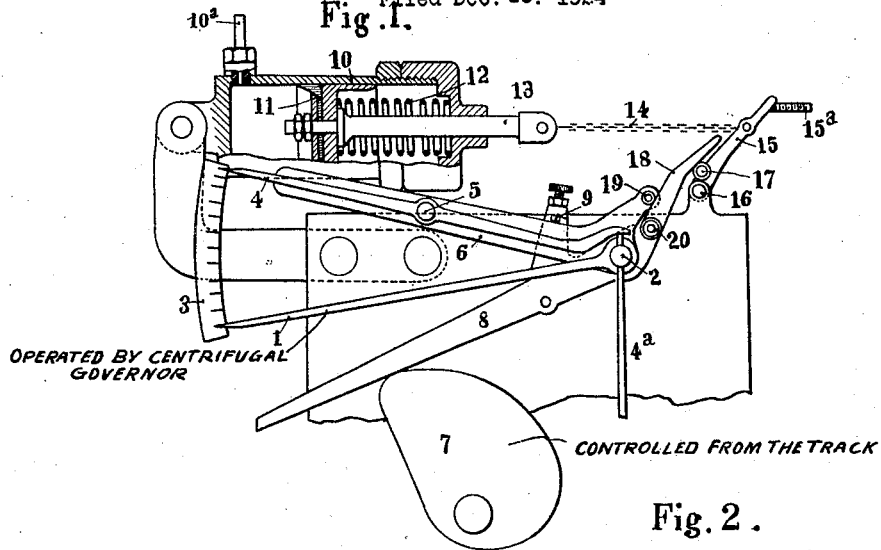
Fig. 1 is a partial front elevation of the supervision and control apparatus showing the device for automatically regulating the control curve of the braking action according to the pressure of the compressed air of the brakes.
Figure 2:
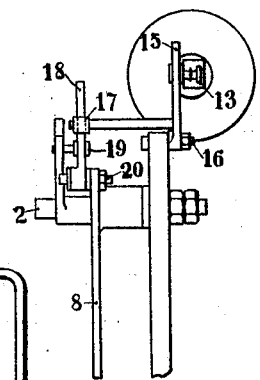
Fig. 2 is a corresponding end view.

As described in the previous United States patents and as illustrated in the present patent application, the speed index 1 is pivotally mounted on the axis 2 and it is connected to the movable element of a centrifugal governor actuated by the wheels of the locomotive, so as to oscillate on the said axis 2 opposite a dial 3 for indicating to the engineer the speed of his train.

The supervision or control index 4 controlled during normal running by the graphic of the track, is so mounted as to be capable of oscillating about an axis 5 carried by an arm 6 pivotally mounted on the axis 2.

This supervision index, which thus oscillates opposite the dial 3, as does the speed index 1, indicates to the engineer the speed which must not be exceeded and acts on the rod 4ª controlling the air exhaust valve of the general pipe line for causing the application of the brakes, when it comes in contact with the speed index.

The supervision index can, moreover, be brought back towards the zero of the dial for indicating a limitation of speed or a stoppage before a closed signal by means of a control cam 7 the release of which is effected by an abutment on the track.

This control cam then effects as described in the apparatus of the above mentioned patents a complete revolution during which it determines the lowering of a lever 8 which draws along, in its descent by means of the abutment 9, the arm 6 carrying the supervision index 4.

As the profile of this cam is so determined that, for a normal pressure of the air of the brakes, the supervision index is brought, at the end of a revolution of the said cam, into a position indicating the stoppage within the distance according to the regulations, it will be understood that if, at the time of the release of the cam, the pressure of the compressed air is, for any cause, inferior to the normal, this cam draws the lever 6, carrying the supervision index 4, too late for the latter, on coming in contact with the speed index 1, to be able to actuate in good time the brakes the power of which is diminished and produce consequently the stoppage of the train opposite the point protected by the signal.

According to the present invention, a cylinder 10 is connected to the main pipe-line of the brakes by a pipe $10^a$ provided with a ball or like nonreturn valve $10^b$ and contains a piston 11 subjected, on one of its faces, to the pressure existing in the said main pipe line and, on its opposite face, to the action of an opposing spring 12, whereby the piston 11 is normally maintained balanced in the cylinder 10, the spring 12, being normally under compression.

The rod 13 of this piston is connected, by a flexible transmission member 14, a chain or the like, to a lever 15 rocking at 16 on the frame of the apparatus and carrying a roller 17, at a suitable point of its length.

This roller 17 is in contact with a second lever 18 which, bearing on a roller 19 of the arm 6 carrying the supervision index, is pivoted at 20 on the lever 8 which is actuated by the cam 7 and brings back, through the medium of the arm 6, the supervision index 4 towards the zero of the dial, when the said cam has been released by an abutment of the track, as has been explained in the previous patents above mentioned.

The device which has just been described is adjusted in the following manner:

When the pressure in the main pipe line is normal, 5 kilograms per square centimeter, the arm 6 carrying the supervision index can occupy a position in which the said index indicates the maximum of speed, 120 kilometer per hour for instance; if the cam 7 is released, it will cause the lever 8 to descend and by means of the screw 9 the arm 6 will be lowered and the index 4 descends toward the zero of the dial so as to control the stopping of the train at the end of a revolution of the cam 7.

When the pressure falls below normal, say to 4 kilograms per sq. cm., the piston 11 moves in its cylinder, towards the left of Figure 1 and carries along the lever 15 which, through this connection 13, 14 with its lever 15, swings the said lever and the engagement of its roller 17 with the lever 18 swings said lever 18 and by the engagement of the lever 18 with the roller 19 on the arm 6, the said arm is swung downwardly and the index 4 carried thereby, is lowered and brought to a subdivision on the dial, which corresponds to a new maximum of speed determined by the pressure in the air pipe-system.

In this new position of the index 4 the lever 8 is kept in the position shown in Fig. 1 by the cam 7, and its screw 9 is out of contact with the arm 6 owing to the lowering of said arm. If now the cam 7 be released with this low pressure in the pipe-system, the lever 8 descends, but instead of the arm 6 being lowered by the screw 9 of the lever 8 engaging the said arm, the arm has been lowered by the lever 18 by its engagement with the roller 19 on the arm 6, the end of the lever 18 during the downward movement of the arm 6 sliding on the roller 17 of the lever 15. The contact of the screw 9 with the arm 6 to lower it, would take place too late to stop the train.

As the roller 17 of lever 15 approaches the pivot 20 of the lever 18 on the lever 8, the movement of the index 4 over the dial is reduced in proportion to the distance of movement over the dial which is to be traversed before zero of the dial is reached.

For instance, at a pressure of 3 kilometers brings the index 4 to the 60 kilometers per hour mark viz: to the middle of the dial, and the index 4 has to move over only one half of the dial in case the cam is released. At this time the roller 17 is in the middle of the length of the lever 18 and as it approaches the pivot 20 of said lever it will reduce the rate of movement of the arm 6 and restrict the movements of the index 4 over the remaining half of the dial. The nearer the roller 17 approaches the pivot 20, the more the movement of the arm 6 is reduced, and when the roller 17 is opposite the roller 19, arm 6 will cease to be moved and the index will be on the zero mark of the dial.

The distance between the axis 2 and roller 19 is less than that between the axis 2 and the screw 9, so that the arm 6 and index 4 are lowered during one rotation of the cam at less speed than when the said parts are lowered directly by the screw 9 carried by the lever 8.

The device therefore permits (in case of a lower pressure) the index 4 to be lowered, the lowering being variable by the displacement of the piston 10 in proportion to the pressure. It also permits the approach of the index towards zero of the dial, until by means of the cam, the progressive and immediate descent of the index 4 towards zero of the dial comes at a time which permits the train to be duly stopped and before the air pressure becomes too low. The lever 15 rests at its free end on a screw $15^a$ which permits of adjusting the position of this lever or of actuating it by hand.

For prolonging the braking action until effective stoppage is obtained, a lever 21

(Fig. 3) has been provided, this lever rocking freely about an axis 30 through which is guided the rod 4ª and on which is mounted a neutralization lever 22, preventing any untimely opening of the valve; which admits compressed air into the brakes by descent of this rod 4ª which is provided with an abutment 23 under which engages the end 22ª of the neutralization lever 22.

The lever 21, normally brought back to the position illustrated in the drawing by a spring 24, is provided, at its upper part, with a projection 25 arranged opposite a small pump barrel 26 connected, by a pipe line 27, to a cock 28 the shell of which is branched onto the exhaust of the air exhaust valve of the main pipe line, by a pipe 30ª.

The cock 28, which is normally closed, is automatically opened near the end of the revolution of the control cam 7, by an abutment 31 carried by the wheel driving the said cam.

The cam 7 having been released, as has been explained, it results from the above arangement that if, at the time this cam arrives near the end of its revolution, the indices 1 and 4 encounter because the speed is not sufficiently reduced thereby causing the opening of the air exhaust valve of the pipe line by the rod 4ª, the exhaust air of this valve passes through the pipe 30ª, through the cock 28, and, through the pipe line 27 into the small pump barrel 26 the piston rod 31ª of which then pushes back the lever 21 whose end 21ª comes above the abutment 23 of the rod 4ª and holds the latter in lowered position and the valve, which controls the admission of compressed air open.

Instead of being pneumatically controlled, the lever 21 might be mechanically actuated by means of a lever 28ª which, rocking about a fixed axis 28ᵇ would be so arranged as to be engaged by the abutment 31, as above set forth, and to produce the suitable displacement of the lever 21 through the medium of a resilient arm 28ᶜ in contact with an abutment 21ᵇ of the lever 21, this device constituting moreover a security member coming into action in case of non operation of the pneumatic device.

In its movement of oscillation determined by one or the other of the above means, the lever 21 carries along with it a locking member constituted by a pivoted latch 33, which engages on the end of a rocking lever 34 acting as an abutment and holds the lever 21 locked in the position in which it has been brought by the piston 31 of the small pump barrel. When the lever 21 has been locked in position, its end 21ª overlies the abutment 23 of rod 4ª and the valve controlling the compressed air is held open.

Figure 3:
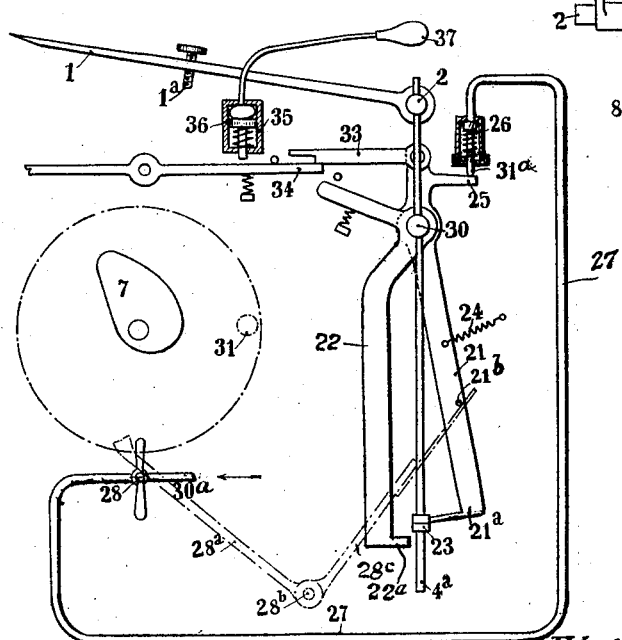
Fig. 3 is a diagrammatic elevation of the device prolonging the braking action.

The return of this lever 21 to the position of rest shown in Fig. 3 is obtained near the end of the downward stroke of the speed index, which encounters and causes to rock by means of the screw 1ª the lever 34 which releases the latch 33 and, consequently the lever 21 which, brought back by its spring 24, abandons the rod 4ª, this determining the closing of the valve; the lever 34 controls, moreover, the oscillation of the neutralization lever 22 the end 22ª of which then comes beneath the abutment of the rod 4ª and holds the latter lifted.

The optional unlocking of the lever 21 in its position of engagement of the lowered rod 4ª might be obtained if need be by means of a small air pump 35, the piston 36 of which, arranged above the lever 34, would be actuated by an air bulb 37. When the lever 34 is operated by the air pump 35 by operating the bulb 37, it operates this lever 22 and causes its end 22ª to pass under the abutment 23 of rod 4ª and thereby prevents the rod from being lowered and the valve from being opened by the meeting of the two indices 1 and 4.

The above arrangements are, of course, given by way of example only; the forms, materials, and dimensions of the various constituent parts can be modified without departing thereby from the principle of the invention.

I claim:

1. An apparatus for the supervision and control of the stoppages and diminutions of speed of railway trains, comprising: an index indicating the real speed of a train,—an axis carrying this index,—a lever pivoting on this axis,—a supervision index pivoting on this lever above the first index and indicating the limitations of the speed,—a control cam with automatic release,—a lever actuated by this cam and bringing back the supervision index to the stoppage position,— a rod controlling the distribution of air to the brakes and actuated by the supervision index when the latter encounters the speed index,—means, whereby the brakes will be automatically operated when the pressure of the compressed air is inferior to the normal,—and means for automatically locking the rod controlling the distribution of air to the brakes.

2. An apparatus for the supervision and control of the stoppages and diminutions of speed of railway trains, comprising: an index indicating the real speed of a train,—an axis carrying this index,—a lever pivoting on this axis,—a supervision index pivoting on this lever above the first index and indicating the limitations of the speed,—a control cam with automatic release,—a lever actuated by this cam and bringing back the supervision index to the stoppage position,— a rod controlling the distribution of air to the brakes and actuated by the supervision index when the latter encounters the speed index,—a cylinder and a pipe connecting this cylinder to the main pipe line of the brakes, a nonreturn valve in this pipe, a piston in the cylinder, a spring pushing back this piston against the action of the air of the main pipe line, a flexible transmission member connected to the said piston, a rocking lever connected to this flexible transmission member, a roller on the said lever, another roller mounted at the end of the lever on which the supervision index is pivoted, a lever interposed between these two rollers and pivoted on the end of the lever actuated by the control cam and bringing back the supervision index, at a speed variable with the pressure existing in the main pipe line, towards the stoppage position as soon as the control cam has been released,—and means for automatically locking the rod controlling the distribution of air to the brakes and for prolonging the action of the latter until effective stoppage.

3. An apparatus for the supervision and control of the stoppages and diminutions of speed of railway trains comprising: an index indicating the real speed of a train,—an axis carrying this index,—a lever pivoting on this axis,—a supervision index pivoting on this lever above the first index and indicating the limitations of the speed,—a control cam with automatic release,—a lever actuated by this cam and bringing back the supervision index to the stoppage position,—a rod controlling the distribution of air to the brakes and actuated by the supervision index when the latter encounters the speed index,—a cylinder and a pipe connecting this cylinder to the main pipe line of the brakes, a nonreturn valve in this pipe, a piston in the cylinder, a spring pushing back this piston against the action of the air of the main pipe line, a flexible transmission member connected to the said piston, a rocking lever connected to this flexible transmission member, a roller on the said lever, another roller mounted at the end of the lever on which the supervision index is pivoted, a lever interposed between these two rollers and pivoted on the end of the lever actuated by the control cam and bringing back the supervision index, at a speed variable with the pressure existing in the main pipe line, towards the stoppage position as soon as the control cam has been released,—an abutment on the rod controlling the distribution of air to the brakes, two locking levers arranged one on either side of this rod, a projection on each lever adapted to engage with the abutment of the rod, a spring for each lever releasing the projections from the abutment, an air cylinder, a pipe connecting this cylinder to the exhaust of the exhaust valve of the main pipe line of the brakes, a cock on this pipe, a projection rotating with the cam controlling the supervision index and adapted to open the cock at the end of the rotation of the said cam, a piston in the air cylinder, a lug rigid with one of the locking levers, in contact with the piston and adapted to bring the projection of this lever above the abutment of the rod controlling the distribution of air to the brakes, a device immobilizing this lever in this position, and an unlocking device adapted to permit the return of the said lever and to bring the projection of the second locking lever beneath the abutment of the rod controlling the distribution of air to the brakes, a security device having a lever adapted to be actuated by the projection rigid with the cam, and a spring arm rigid with this lever and in contact with the first locking lever for bringing the projection of the latter above the abutment of the rod controlling the brakes in case of nonoperation of the air cylinder.

The foregoing specification of my controlling device for railway and tramway trains, signed by me this 5th day of December, 1924.

ELOI RODOLAUSSE.